Figure 1:
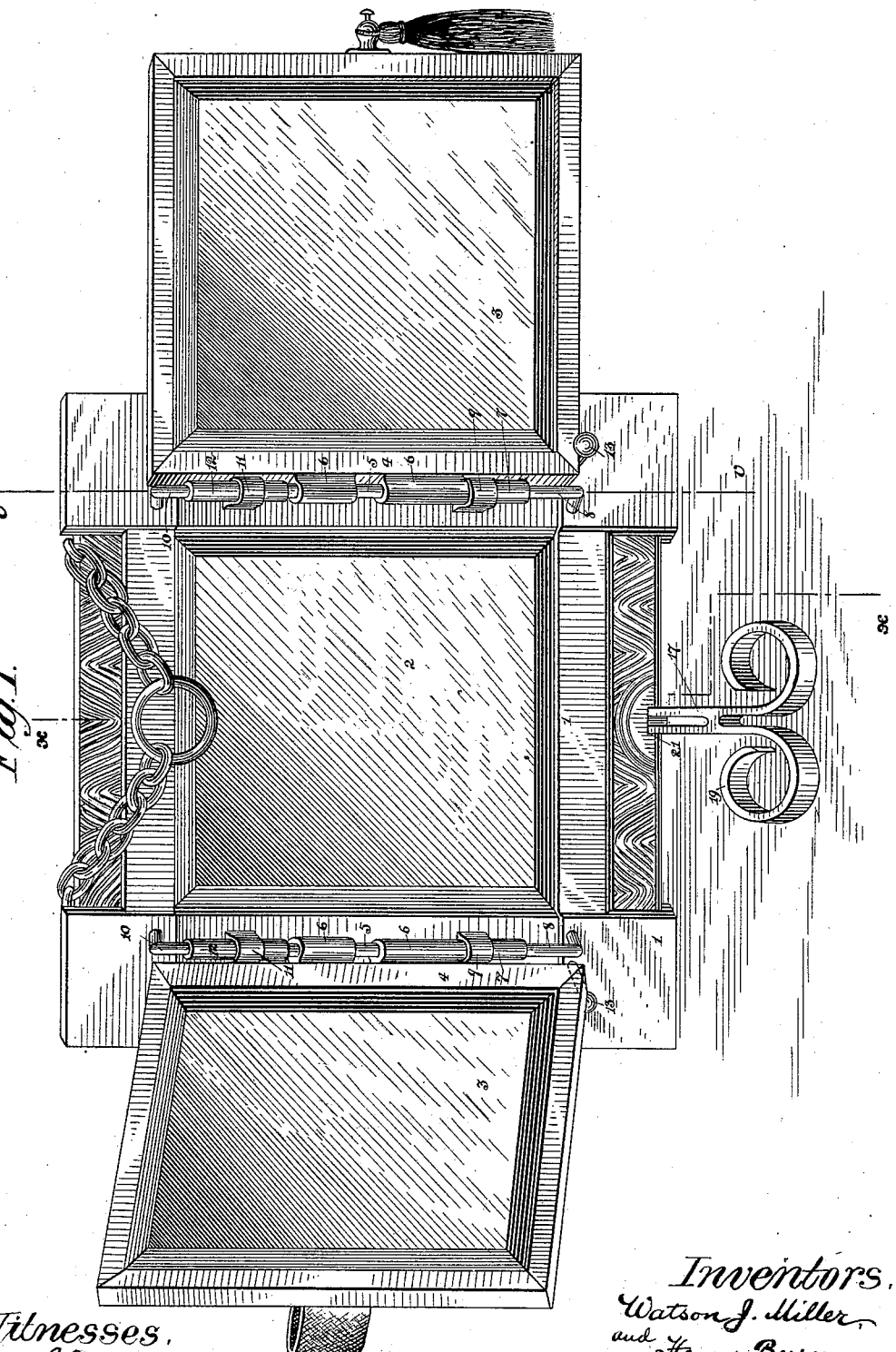

(No Model.) 2 Sheets—Sheet 1.

W. J. MILLER & H. BERRY.
FOLDING MIRROR.

No. 392,215. Patented Nov. 6, 1888.

Witnesses.
Wm. J. Tanner.
H. J. Shelton.

Inventors.
Watson J. Miller
and Henry Berry
by S. H. Hubbard,
Attorney.

(No Model.) 2 Sheets—Sheet 2.
W. J. MILLER & H. BERRY.
FOLDING MIRROR.
No. 392,215. Patented Nov. 6, 1888.
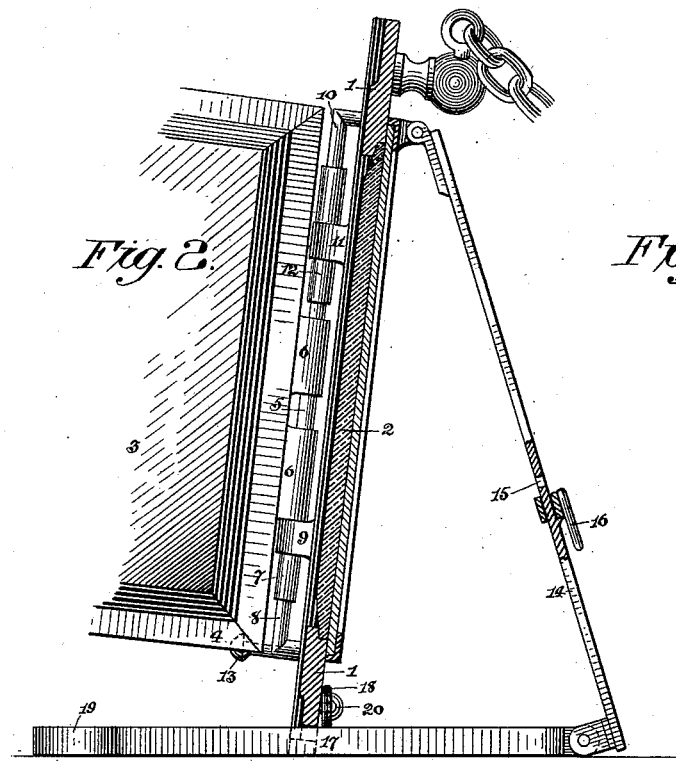
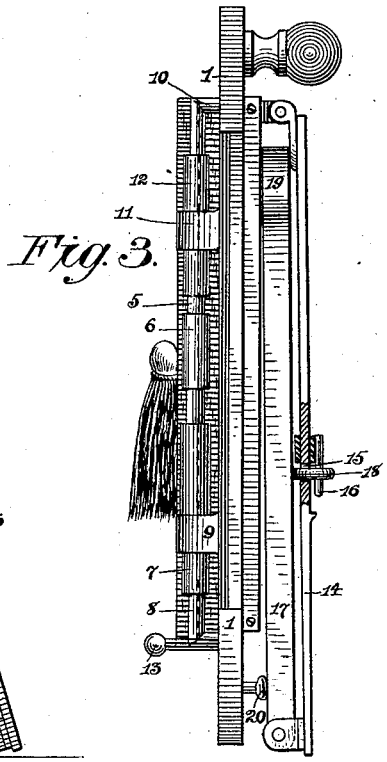
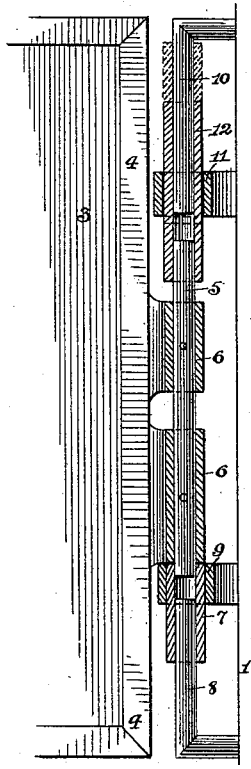
Witnesses
Wm. J. Tanner
H. J. Helm Jr.
Inventors
Watson J. Miller
and Henry Berry
by J. H. Hubbard, attorney

UNITED STATES PATENT OFFICE.

WATSON J. MILLER AND HENRY BERRY, OF SHELTON, CONNECTICUT.

FOLDING MIRROR.

SPECIFICATION forming part of Letters Patent No. 392,215, dated November 6, 1888.

Application filed April 2, 1888. Serial No. 269,221. (No model.)

*To all whom it may concern:*

Be it known that we, WATSON J. MILLER and HENRY BERRY, citizens of the United States, residing at Shelton, in the county of Fairfield and State of Connecticut, have invented certain new and useful Improvements in Folding Mirrors; and we do hereby declare the following to be a full, clear, and exact description of the invention, such as will enable others skilled in the art to which it appertains to make and use the same.

Our invention relates to certain new and useful improvements in triplicate or other multiple folding mirrors, and has for its objects to provide a device of this description in which the glasses shall be adjustable to various positions, which may be suspended, as from a hook, against a wall, or may be caused to stand upon a table or bureau at two or more angles of inclination, and which may, furthermore, be readily disjointed or unhinged, so as to separate the compound mirror into three independent glasses.

With these ends in view our invention consists in the details of construction, and in the several combinations of mechanical elements, which will hereinafter be fully set forth, and then recited in the claims.

In order that those skilled in the art to which our invention appertains may fully understand both how to make and how to use the mirror which constitutes our improved device, we will now describe the same in detail, reference being had to the accompanying drawings, which form a part of this specification, and in which—

Figure 1 is a perspective of our mirror in standing position, one of the hinged glasses being partially and the other entirely open on its hinge; Fig. 2, a transverse vertical section at the line *x x* of Fig. 1; Fig. 3, an end elevation showing the mirror closed so that it may be hung, and Fig. 4 a section at the line *v v* of Fig. 1.

Like reference-numbers indicate the same parts in all the figures of the drawings.

1 is a frame, which we prefer to make from metal, but which may be constructed of wood or other suitable material; and 2 is a mirror firmly mounted in said frame.

3 are the movable glasses set in suitable frames, 4, and adapted to shut one over the other against the central mirror. The hinge-connection between each of the said movable glasses and the stationary frame 1 is as follows:

5 is a hinge-pin, which is secured to the rear edge of the frame 4 and at a little space therefrom by means of lugs 6. It has a bearing point at each end thereof, as is clearly shown at the detail section Fig. 4.

7 is a socket mounted upon a rectangular supporting-arm, 8, which passes through a lug, 9, at the front of the frame 1. The lower bearing-point of the hinge-pin 5 is adapted to fit within and to turn in said socket.

10 is a rectangular and downwardly-extending arm secured to the face of the frame 1. A perforated lug, 11, projecting from the face of the said frame, surrounds but does not touch said arm.

12 is a loose sleeve, adapted to slide over the vertical portion of the arm 10 and within the open lug 11. The lower end of this sleeve forms the socket-bearing for the upper end of the hinge-pin 5. The vertical movement of which said sleeve is capable is shown in dotted section-lines at Fig. 4.

It is obvious that so long as the lower end of the hinge-pin is within its socket and the hollow sleeve fits over the upper end of said pin the glass is connected to the main frame by a strong and simple hinge-joint. It is also obvious that to entirely disconnect the hinged glass from the main frames it is only necessary that the sleeve be raised out of engagement with the top of the hinge-pin, and that the glass be then raised, so that lower end of the pin be lifted clear of its bearing. The glass may be again connected by a reversal of the operations just specified.

The hinge above described admits a slight vertical play to the glasses without the disengagement thereof from the frame. The purpose of this play we will now describe.

13 are round or oval headed stops, which project outwardly from the surface of the main frame, the center of their heads being very slightly below the plane of the lower edges of the swinging glasses. When it is desired to open the glasses, or either of them, and to retain them at an angle to the central mirror, they will be so held by engagement of their lower edges with the round head of the stop. This engagement is sufficient to hold the glass in its partially-opened position. (See the glass at the left hand of Fig. 1.) If, however, it is desired to open the glasses to the same plane as the central mirror, (see right hand of Fig. 1,) the glass will, when forced against the round head of the stop, lift upon its hinge by the cam action of the stop against it, and thus pass freely back to its farthest open position. We have described these stops as round-headed; but we do not desire to be limited to this shape of stop, since any form which will serve to detain the glass when the weight thereof rests against it, but which will act as a cam to lift the glass upward upon its hinge when power is applied and so allow it to swing entirely back, will answer equally as well.

At the back of the main frame, near its top edge, is hinged a leg, 14, which is slotted at or near its center at 15.

16 is a sliding latch arranged upon the leg.

17 is a folding base-rest, which is hinged to the lower end of the leg. This rest has a loop or ring, 18, secured thereon, which is adapted to pass through the slot 15, and to be secured against it by the latch when the mirror is to be suspended, as is clearly shown at Fig. 3. The base-rest is also adapted by reason of its broadened extremity 19, (see Figs. 1 and 2,) to support the mirror in an inclined position. When thus utilized, a headed stud, 20, at the lower rear edge of the main frame, is engaged with the loop 18, thereby holding the mirror as against any tendency to slide forward upon the base-rest; or, if it is desired, the frame may be drawn forward on the base-rest until its edge abuts against the widened ends thereof. A slight notch, 21, fits over the base-rest, and thereby prevents the frame from traveling in any but the proper plane.

We do not wish to be confined to the exact details of construction which we have herein shown and described, since many minor changes entirely within the province of mechanical skill can be made therein without departing from the spirit and aim of our invention.

We claim as of our invention—

1. The combination, with the main frame and the central mirror mounted therein, of the two swinging glasses, the vertically-yielding hinge-joints interposed between and connecting said glasses and the frame, whereby said glasses, in addition to their segmental movement about their hinge-bearings, may have a vertical play thereon, and a pair of stops affixed to the frame for the detention of the said glasses at an angle to the frame, substantially as specified.

2. The combination, with the central mirror and the swinging glasses arranged one at either side thereof, of a pair of stops projecting outwardly from the main frame in the plane of the lower edges of the hinged glasses, whereby said glasses may be detained at an angle to and out of contact with the main frame, substantially as specified.

3. The combination, with the central mirror, of the side glasses hinged to the frame and arranged to have a vertical movement upon their hinge-joints, and the round-headed abutment-stops adapted to engage said hinged glasses, whereby the latter may be detained at an angle to the central mirror or may be swung backward to a plane parallel thereto, substantially as set forth.

4. In a mirror, the combination, with the main frame, of the swinging glass, the double-ended hinge-pin secured thereon, a socket projecting outward from the main frame for the reception of the lower end of said hinge-pin, a downwardly-projecting arm in line with the lower socket and secured to the frame, an open lug surrounding said arm, and a movable sleeve adapted to engage said arm and the upper end of the hinge-pin, as described.

5. The combination, with the main frame, of the hinged leg at the rear side thereof, and the base-rest hinged to the end of the leg and adapted to fold upwardly against the same, substantially as set forth.

6. The combination, with the main frame, of the leg hinged at the rear side thereof, the broad-ended base-rest hinged to the lower end of said leg, and a suitable latch-connection, whereby, when the base rest is folded against the leg, it may be there retained, substantially as described.

7. The combination, with the main frame having a headed stud near the bottom edge thereof, of the leg hinged at the top of the frame, the broad-ended base-rest hinged to the lower end of the leg, a ring upon the base-rest adapted to engage with the headed stud, and a sliding latch upon the leg adapted to engage with said ring when the leg is folded, substantially as set forth.

8. The main frame having the hinged leg, and the base-rest secured at the rear side of the main frame, in combination with the swinging mirrors arranged at each side the central glass and adapted to have a vertical movement upon their hinges, and the round-headed stops projecting from the frame and adapted to engage the bottom edges of the respective swinging mirrors, substantially as described.

In testimony whereof we affix our signatures in presence of two witnesses.

WATSON J. MILLER.
HENRY BERRY.

Witnesses:
STERLING D. LOCKWOOD,
WESLEY L. CLARK.